Jan. 14, 1964 R. I. N. WEINGART 3,117,806
MEANS FOR DISPENSING INSURANCE POLICIES OR THE LIKE
Filed Dec. 1, 1959 9 Sheets-Sheet 1

*INVENTOR.*
RICHARD I. N. WEINGART
BY
ATTORNEYS

Jan. 14, 1964 R. I. N. WEINGART 3,117,806
MEANS FOR DISPENSING INSURANCE POLICIES OR THE LIKE
Filed Dec. 1, 1959 9 Sheets-Sheet 2

FIG. 3.

INVENTOR.
RICHARD I. N. WEINGART
BY
ATTORNEYS

Jan. 14, 1964 R. I. N. WEINGART 3,117,806
MEANS FOR DISPENSING INSURANCE POLICIES OR THE LIKE
Filed Dec. 1, 1959 9 Sheets-Sheet 3

INVENTOR.
RICHARD I. N. WEINGART
BY
ATTORNEYS

Jan. 14, 1964  R. I. N. WEINGART  3,117,806
MEANS FOR DISPENSING INSURANCE POLICIES OR THE LIKE
Filed Dec. 1, 1959  9 Sheets-Sheet 4

*INVENTOR.*
RICHARD I. N. WEINGART
BY
ATTORNEYS

Jan. 14, 1964 R. I. N. WEINGART 3,117,806
MEANS FOR DISPENSING INSURANCE POLICIES OR THE LIKE
Filed Dec. 1, 1959 9 Sheets-Sheet 5

INVENTOR.
RICHARD I. N. WEINGART
BY
ATTORNEYS

FIG. 14.

Jan. 14, 1964     R. I. N. WEINGART     3,117,806
MEANS FOR DISPENSING INSURANCE POLICIES OR THE LIKE
Filed Dec. 1, 1959     9 Sheets-Sheet 8

*INVENTOR.*
RICHARD I. N. WEINGART
BY

ATTORNEYS

Jan. 14, 1964   R. I. N. WEINGART   3,117,806
MEANS FOR DISPENSING INSURANCE POLICIES OR THE LIKE
Filed Dec. 1, 1959   9 Sheets-Sheet 9

FIG. 19.

INVENTOR.
RICHARD I. N. WEINGART
BY

ATTORNEYS

United States Patent Office 3,117,806
Patented Jan. 14, 1964

3,117,806
MEANS FOR DISPENSING INSURANCE
POLICIES OR THE LIKE
Richard I. N. Weingart, E. Bay St., P.O. Box 1526,
Nassau, Bahamas
Filed Dec. 1, 1959, Ser. No. 856,461
16 Claims. (Cl. 282—7)

This invention relates to the issuance of insurance policies or other documents relating to future undertakings, and more particularly to a method and machine for issuing such policies or the like in return for the tender of paper currency.

There are currently in widespread use coin-operated machines which dispense accident insurance policies such as air carrier trip insurance. In these machines, a "write-in" space of a policy form is uncovered upon the deposit of one or more coins, for example, quarters, and the purchaser writes his name, address, and destination and beneficiary's name, in the space provided. A duplicate form bearing a carbon copy of this information, in the purchaser's own handwriting, is retained in the machine, while the original form is ejected for keeping by the purchaser. The machine stamps on the original and duplicate forms the time and date of issuance and the amount of insurance corresponding to the deposited coins.

The coin-operated machines now in use are not completely satisfactory in two main respects. First, if a counterfeit coin or "slug" is tendered, the policy nevertheless is issued, and in the event of a casualty there is no way for the underwriter to determine whether good consideration was given for the insurance. The underwriter may therefore be defrauded, since it has no legal, probative evidence that a claimant's policy was obtained with counterfeit money. Secondly, and for a number of reasons, there are no machines which are capable of satisfactorily receiving paper currency as tender. With some assurance fairly simple means can be provided to detect the great majority of bogus coins, but the cost of elaborate means for detecting counterfeit paper prohibits the expansion of these machines to paper currency operation. The idea of paper currency-operated machines also raises difficult problems of feeding and handling the paper bills. By the present invention all of the above drawbacks and problems in the issuance of accident insurance have been overcome. The invention also makes possible the issuance of insurance policies or similar documents in return for payment by personal check, travelers check, money orders or the like.

Hereafter, for simplicity of description, the invention will be described as applied to the issuance of insurance policies upon insertion of paper currency, but it will be evident that it is equally applicable to the issuance of other documents involving future obligations of the party providing the machine and in response to tenders other than curency.

The invention involves the identification or association of the paper tendered, whether genuine or counterfeit, with the particular insurance policy issued in return for such tender. Such identification or association of the bill with the policy issued is such that an underwriter will have absolute proof that a particular policy, on which the insured bases a claim, was obtained with countefeit money and the contract was, therefore, without consideration. Such identification may ultimately lead to the detection of counterfeiting operations and is, therefore, also in the government's interests.

As will be seen from the various embodiments of the invention described hereafter, an insurance policy form and the bill for which it was issued may be associated in a number of ways. According to one form of the invention, the bill is positioned underneath the "write-in" space and through an ink backing on the lower form, writing by the purchaser carries through to the bill which he has deposited. This backing may consist of a visible but washable ink or, if desired, an initially invisible ink that is susceptible to chemical development or readable under special lighting. Various such methods of producing writing that is normally invisible to the naked eye are well known to that particular art and may be employed for identification of paper tender in accordance with the invention.

Periodically the bills are removed from the machine and inspected to detect suspicious or counterfeit bills and other signs of fraud such as a mere ordinary piece of paper tendered instead of a genuine bill. Those bills which are considered genuine may be placed back into circulation. As to facsimiles, counterfeits or paper substitutions, however, a number of courses of action may be taken. Since the names of the purchaser and possibly the beneficiary appear on the paper tender, the purchaser and/or the beneficiary may be notified immediately that unless genuine tender is remitted the policy will be void and no recovery will be had thereunder. The underwriter may, of course, merely hold the fraudulent tender as evidence of the fraud and refuse to satisfy any claims arising under the policy. A further step might be to notify the interested government authorities and cooperate with them in any way deemed appropriate. In the case of a personal or traveler's check purchaser's handwriting may be reproduced on the reverse side and this might prove invaluable if for some reason the check is returned unpaid. If in the meantime a trip, for example, has been completed without incident, and counterfeiting is not involved, the underwriter may prefer not to take any action.

If desired, the bill may be deposited in a sealed envelope which may then be positioned under the "write-in" space, a carbon copy of the purchaser's handwriting being provided on the face of the envelope. Another way of associating a bill and a policy is to actually attach the bill to the duplicate copy retained in the machine. According to one specific embodiment disclosed hereafter the bill is stapled to an extended marginal portion of the duplicate, but the attachment may be by means of an adhesive, for example pressure or heat sensitive, or by a folded over flap. In a further specific embodiment of the invention the bill is inserted and held between a pair of paper strips fed transversely under the policy forms at the "write-in" space. Other methods of association or identification are contemplated, for example, the imprinting of a special identification mark on the bill and policy forms simultaneously.

Streckfuss, U.S. Patent 2,266,825 discloses a coin-operated machine for issuing insurance policies which is typical of some machines presently in use. Although practically any conventional policy issuing machine may be modified to operate according to the present invention, the machine elements disclosed hereafter include the basic machine structure disclosed in the Streckfuss patent to which reference may be made for certain mechanical details.

It is the general object of the invention to facilitate the issuance of insurance policies or the like in consideration for paper currency or other paper tender, and to associate or absolutely identify that which is tendered with the policy or document issued.

Further objects and advantages will become apparent from the following description read in conjunction with the accompanying drawings, in which.

Figure 1:
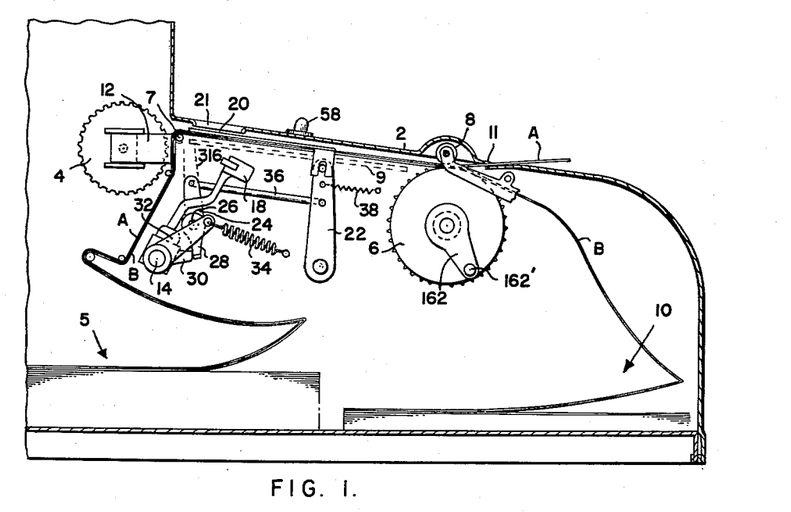
FIGURES 1 and 2 are mechanical diagrams showing the basic elements of a conventional policy issuing machine, such as disclosed in Streckfuss U.S. Patent 2,266,-825, and which are common to all of the various forms of the invention to be described hereafter, certain minor modifications having been made to adapt the structure to the invention.
Figure 2:
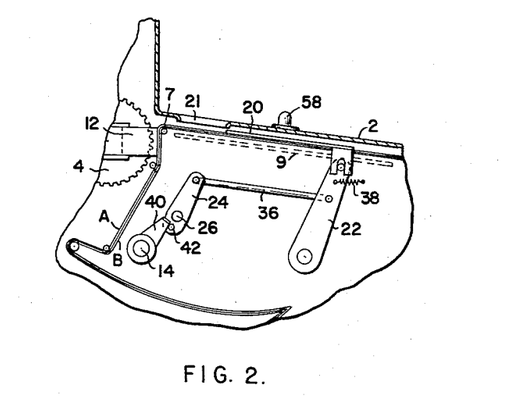

Referring to FIGURE 1, there are shown the mechanical elements which are common to the various forms of the invention to be described hereafter with reference to FIGURES 3 to 19. With certain minor exceptions what is shown in FIGURES 1 and 2 is identical with the machine shown in the previously mentioned Streckfuss patent and what is described hereafter represents means supplementing the mechanism of FIGURES 1 and 2 and therewith making up complete machines according to the invention. The machine comprises a housing 2, closed against other than authorized access, wherein an original policy form strip A, portions of which art to be dispensed to purchasers, and a duplicate or record form strip B, to be retained in the machine, are fed from a supply bin at 5 past time imprinting wheels 4 and a guide rod 7 by means of a conventional pin wheel paper feed comprising feed rolls 6 and 8. The forms A and B, of course, are perforated at their margins to cooperate with the pin feed rolls 6. This paper feed may be simply a conventional single revolution device adapted to feed a given length of paper on each operation. The record form B is delivered to a storage space 10 within the machine while the original form A is ejected for removal by tearing against a tearing edge 11. The time wheels 4 are conventional and bear type faces indicating the time at the instant a policy is issued, the wheels 4 being driven by a clock or the like (not shown) contained in the housing 2. The inked ribbon 12, for producing a visible imprinting, is interposed between the time wheels 4 and the form strips A and B. The main operating shaft 14 is rocked by a solenoid 16 (see FIGURE 6) and bears the printing hammer 18 which, upon rocking of shaft 14 by solenoid 16, strikes the back of form B to produce a printing on forms A and B by the type face on time wheels 4. The printing on form B is effected by a carbon backing on form A in the area thereof adjacent time wheels 4. If desired, a numbering head advance one unit upon each issuing operation also may be provided for printing serial numbers on successive policy forms. The paper feed 6, 8 is so adjusted that at the beginning of a cycle of operation the write-in spaces on forms A and B are positioned beneath a shutter 20 covering an aperture 21 in the housing 2.

Access to forms A and B for writing thereon the purchaser's name and other pertinent information, through aperture 21, is provided by withdrawal of shutter 20 from aperture 21, this being effected through a lever 22. Form A has a carbon backing also in the area directly under aperture 21, whereby the writing on form A is reproduced on record form B. A second lever 24 is fixedly mounted on the rock shaft 26, but pivoting of lever 24 in a clockwise direction in FIGURES 1 and 2 is normally limited by means of a lug 28 fixed on shaft 26 and abutting a similar lug 30 fixed on shaft 14. Upon rocking movement of shaft 14 by solenoid 16 to drive printing hammer 18 the lug 30 is rotated from engagement with lug 28 to allow clockwise movement of lever 24. The shaft 14 is maintained in the rest position shown in FIGURE 1 by its arm 32 and spring 34. Lever 22 is connected to lever 24 by means of link 36, and is urged in a direction to open shutter 20 by a spring 38. Thus it will be seen that operation of printing hammer 18 by shaft 14 also effects opening of shutter 20 to permit writing on forms A and B. The shutter 20 is closed after a cycle of operation by the lever 40 (FIGURE 2) which acts on a pin 42 provided on lever 24. This is due to the fact that when solenoid 16 is de-energized spring 34 will urge shaft 14, upon which lever 40 is fixed, in a clockwise direction as seen in FIGURE 2.

Figure 3:
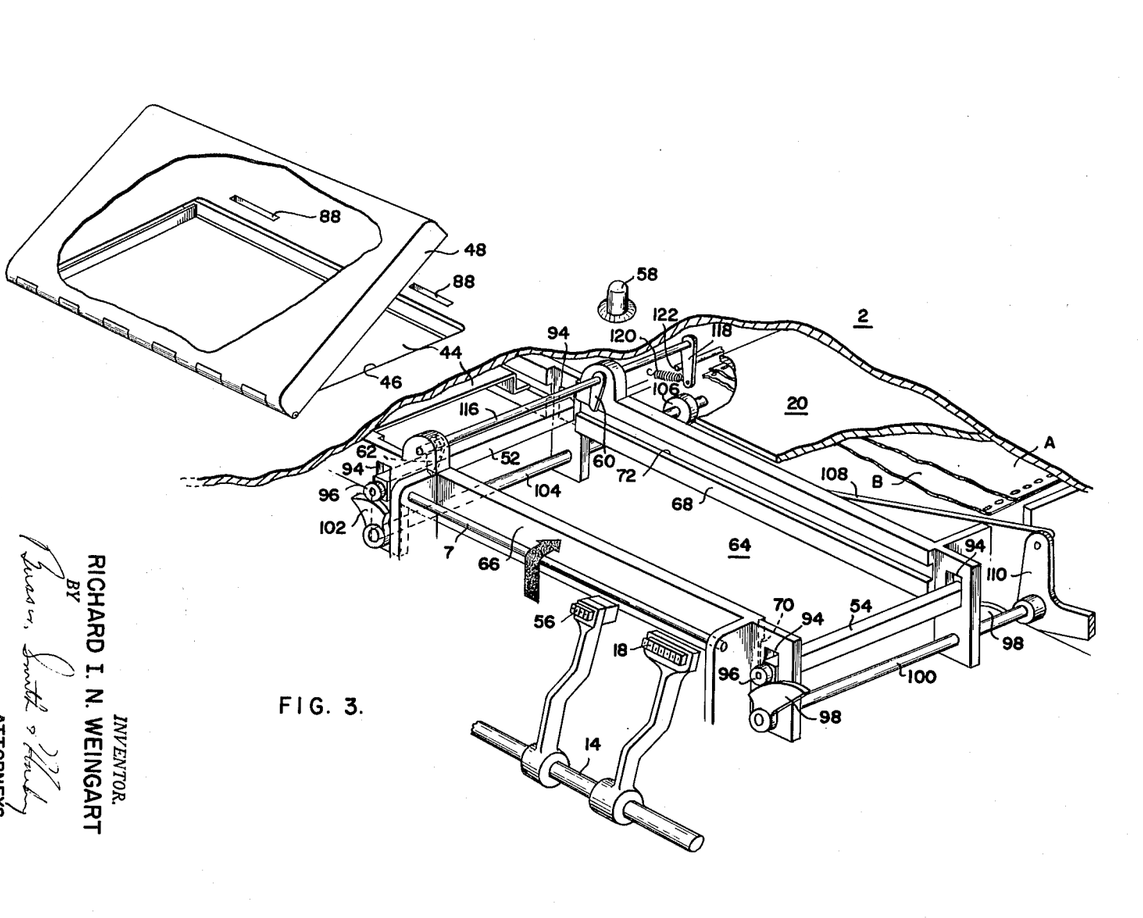
FIGURE 3 is a perspective view, partly cut away, of a first embodiment of the invention wherein the bill, or an envelope in which the bill is contained, is positioned beneath the write in space of the machine.
Figure 8:
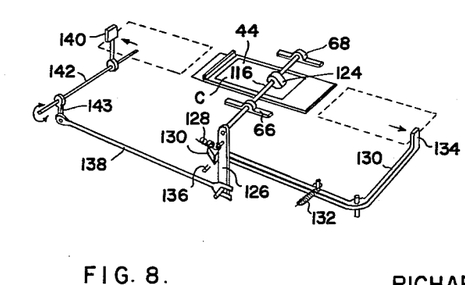
FIGURE 8 illustrates a modification of the bill gripping means shown in FIGURE 3.

Referring now to FIGURE 3, there is illustrated an arrangement for positioning a bill under the write-in aperture 21, so that any handwriting on forms A and B will be reproduced to identify the bill. The FIGURE 3 embodiment of the invention is particularly intended to handle an envelope, which has some stiffness, and in which the purchaser has placed a bill, while, as will be presently discussed, the arrangement shown in FIGURE 8 is more adapted to the handling of the bill only.

Figure 4:
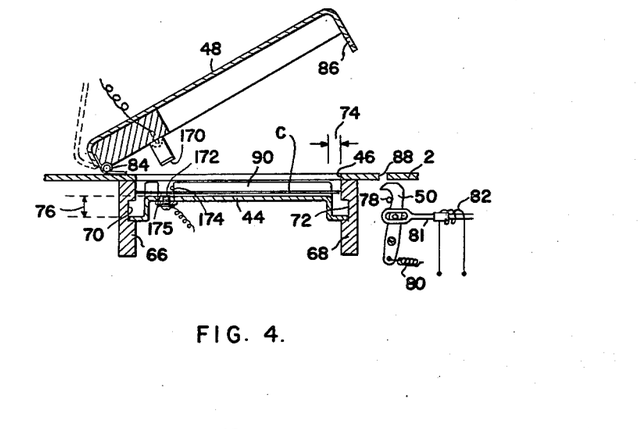
FIGURE 4 is a cross-section through the tray and lid portion of the structure shown in FIGURE 3.

Beneath the surface of the housing 2 there is provided a tray 44 which in its left-hand position (FIGURE 3) is accessible through an opening 46. The receptacle or opening 46 is adapted to be closed by a lid 48, pivotally mounted on the housing 2 by a piano hinge as illustrated in FIGURES 3 and 4, which is held in closed position by a latch 50 (FIGURE 4). By the automatic controls described hereinafter, the tray 44 is moved in (to the right in FIGURE 3) to a position under the forms A and B and shutter 20 (then closed) and forced upwardly by bars 52 and 54. Hammer 18, and if desired a second hammer 56 for imprinting the premium paid for the policy will then be actuated and, through rocking of shaft 14, the shutter 20 will be released to provide access to the write-in space on form A. The underside of form B, the duplicate, has a carbon or ink backing which, when form A is written upon, duplicates the handwriting on the bill or an envelope in which it has been placed. As discussed in the introduction hereto, the backing on form B may of course comprise the usual visible ink, preferably washable, or normally invisible ink which may be rendered visible by chemical or light treatment. If writing is to be effected on the bill itself a washable or invisible ink will be preferred, whereas for writing on an envelope an ordinary carbon backing may be satisfactory. Throughout the description to follow the letter "C" will be used to refer to either the bill itself or the envelope in which the bill has been placed. If in the FIGURE 3 arrangement the bill has been placed in an envelope, on its inward movement by tray 44, it will pass under a pair of elements 60 and 62, but on return movement of tray 44 to the left in FIGURE 3, these elements, 60 and 62, will abut the back edge of the envelope to prevent reverse movement thereof and it will drop through the opening 64 into a suitable storage space within the housing 2. Through the carbon backing on from A the purchaser's handwriting will have been reproduced on the duplicate form B, and through the carbon backing on form B the purchaser will also have written on the envelope containing the bill which he tendered in consideration for the insurance policy. It is not necessary to reproduce on the envelope or bill all of the writing on the form, since the purchaser's signature only and possibly his address may be sufficient.

The tray 44 is supported by a pair of members 66 and 68, wherein are formed respectively channels 70 and 72. A space 74 (FIGURE 4) is provided between tray 44 and the members 66 and 68, which space is sufficient to provide clearance for the elements 60 and 62. The height 76 of the tray 44 is such that when the tray 44 is forced upwardly by bars 52 and 54 the envelope C will be positioned directly against the underside of duplicate form B and will provide, as a platen, support for handwriting in the write-in space.

The latch 50 is resiliently urged against a stop pin 78 by a light spring 80, but is movable in a clockwise direction (FIGURE 4) by a slotted member 81 operated by a solenoid 82. Lid 48 is urged upwardly to an open position by a spring 84. Although only one latch 50 is shown, a pair of said latches may be provided in order to insure against tampering, and a pair of extensions having openings 86 therein are provided on lid 48 to extend below housing 2, through apertures 88 therein, and engage latches 50.

Tray 44 has an upstanding envelope-pushing end 90, and it will be noted that the length of the tray extends at 92 for a short distance beyond end 90. This portion 92 is adapted, when tray 44 is all the way to the left in FIGURE 5, to be engaged by bar 54, so that the tray may be forced upwardly against forms A and B, and end 90 is received by the specially contoured housing 2 at 93.

A chute beneath space 64 is provided by members 95 and 97, which guide the envelope C onto a pile indicated at 99.

Figure 6:
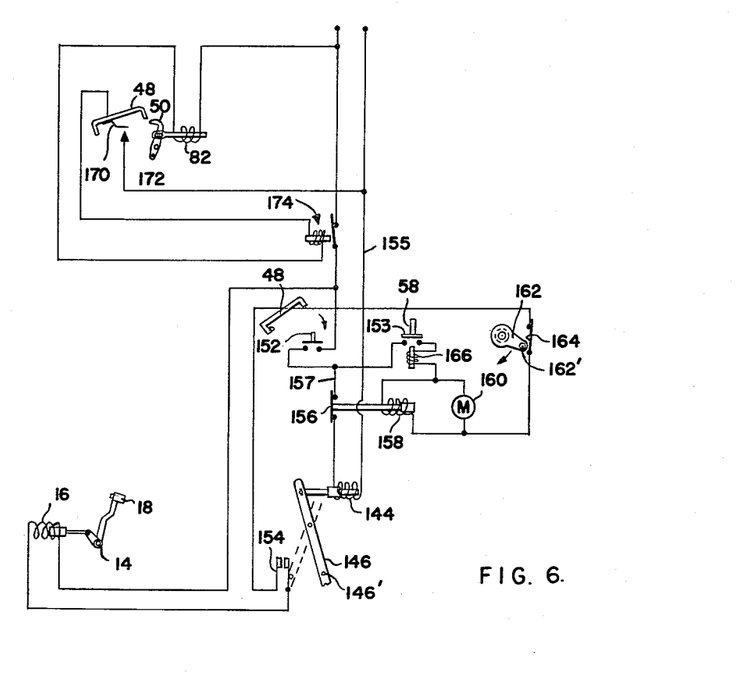
FIGURE 6 is a diagram of the electrical and mechanical elements controlling operation of the particular embodiment of FIGURES 3 to 5.
Figure 7:
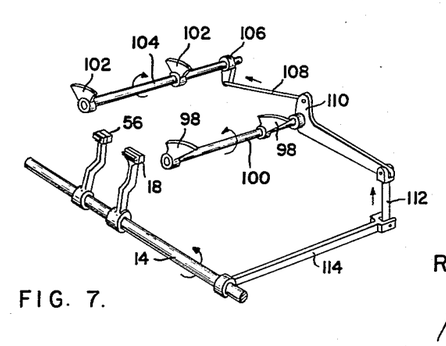
FIGURE 7 is a schematic representation of the linkage for controlling the cams in FIGURE 3.

Bars 52 and 54 slide vertically in guides 94 in the members 66, 68. The ends of members 52, 54 are provided with rollers 96 and these rollers, in the case of bar 54, are acted upon by cams 98 carried on a shaft 100, and in the case of bar 52 by cams 102 carried by shaft 104. Referring particularly to FIGURE 7, shaft 104 is rocked by a lever 106 connected by link 108 to a bell crank lever 110 secured to shaft 100. Bell crank lever 110 is rocked through linkage 112, 114 by the previously described shaft 14, which carries printing hammers 18 and 56 and is operated by solenoid 16 (FIGURE 6). Thus it will be apparent that rocking of shaft 14 to actuate printing hammers 18 and 56 will also effect rotation of cams 98 and 102 to raise, through rollers 96, the bars 52 and 54. De-energization of solenoid 16 to release shaft 14 will then effect a lowering of tray 44.

The elements 60, 62 are fixed to a transverse shaft 116 which is urged in a clockwise direction (in FIGURE 3) by a member 18 and a very light spring 120, the rotation being limited by a stop 122. In operation, as tray 44 moves inwardly the forward end of an envelope carried thereby will engage and displace counterclockwise the elements 60, 62, but when tray 44 returns (to the left in FIGURE 3) after a cycle of operation the other end of the envelope, which extends beyond the central portion of the tray surface, will engage elements 60, 62. Since clockwise rotation of shaft 116 is limited the envelope C will not displace elements 60, 62 and will drop downwardly through space 64 to a storage space while the tray 44 moves out from under the envelope.

As previously mentioned the elements 60, 62 are particularly adapted for holding a relatively stiff envelope, containing a bill, from moving with tray 44 while it moves outwardly. However, a bill that has been in circulation for some time may be worn and lack stiffness, and therefore the operation of elements 60, 62 on such a bill may not be satisfactory. Accordingly, referring to FIGURE 8, there is shown a modification of the invention whereby a bill, not enclosed in an envelope, may be similarly held. A rubber finger 124 is fixed to a transverse shaft 116 which is adapted to be rotated by an attached lever 126. A spring 128 urges lever 126 against an L-shaped latch member 130, which is urged counterclockwise (FIGURE 8) by a spring 132. The member 130 is adapted to limit rotation of lever 126 by spring 128, but an extension 134 is engageable by the end of tray 44 to release the latching action. This will cause the rubber finger 124 to be urged against a bill carried on tray 44 to prevent return of the bill with the tray, whereby as the tray 44 withdraws from under the bill it will drop through space 64. The stop 136 limits the rotation of lever 126 upon release thereof. Resetting of latch member 130 is effected by a forked rod 138 operated by an abutment 140 in the path of return movement of tray 44. Abutment 140 is connected to rod 138 by linkage 142, 143.

Figure 5:
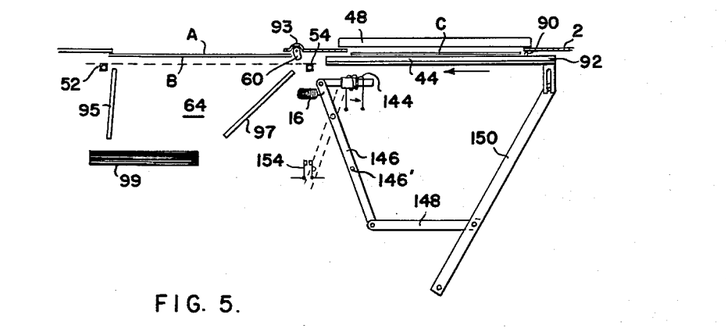
FIGURE 5 is a schematic representation of the structure shown in FIGURES 3 and 4.

Referring to FIGURE 6, the controls for the machine described with reference to FIGURES 3 to 5 will now be described. Tray 44 is reciprocated by a solenoid 144 and interconnecting linkage 146, 148, 150 (FIGURE 5). A switch 152 (shown in FIGURE 6, but not shown in FIGURES 3 to 5) is adapted to be closed in any suitable manner by the closing of lid 48, thereby to complete a circuit through solenoid 144 and energize same to move tray 44 to a position under forms A and B. Linkage 146 carries an element 146' which, upon movement thereof to the dotted line position in FIGURE 6, closes contact 154 to energize the solenoid 16, previously referred to, for rocking shaft 14.

A push button 58 is positioned in housing 2 (see FIGURES 1 and 3) where it may be depressed, according to instructions written on the machine, by the purchaser after the writing on form A, through the open aperture 21, has been completed. Closure of a switch 153 by push button 58 serves the function, first, of energizing a solenoid 158, connected in series therewith, to open a normally closed switch 156 in series with switch 152 and solenoid 144, thereby de-energizing solenoid 144, and secondly to initiate operation of a motor 160 in series with switch 153 for driving pin feed rolls 6 and 8. It will be noted that push button 58 has a holding coil 166 to retain it in the closed position. It will be noted also that switch 153, motor 160, and solenoid 158 are connected across lines 155 and 157, and that this connection is dependent upon a normally closed switch 164. Mounted upon pin feed roll 6 is an arm 162 having an element 162' which is adapted to momentarily open the switch 164 as the feeding of a length of forms A and B is completed. The opening of switch 164 interrupts the current through holding coil 166, thereby de-energizing also solenoid 158 and stopping motor 160. The opening of switch 164 is only momentary because otherwise, that is if switch 164 remained open, the circuit would not be conditioned for the next cycle of operation.

A feature of the invention is that if neither a bill nor a bill in an envelope, nor at least a piece of paper, is placed in the bill receptacle, that is tray 44, the machine will not operate and the lid will reopen. Solenoid 82 is connected in series with a relay 174, a contact 170 provided in lid 48, and a contact 172 provided in tray 44. Contact 172 is in the form of a screw threaded into an insulating material, such as bakelite, secured to tray 44 beneath a cut-out portion 175 therein. The envelope-pushing end 90 is cut out at 174 to accommodate contact 170 during reciprocation of tray 44. Usually, a bill or envelope C will be deposited on tray 44 and contact 170 will be insulated from contact 172. The relay 174 is provided for deactivating the remainder of the machine control elements in the event that element 170 makes contact with contact 172. Relay 174 is not absolutely necessary, however, due to the fact that when solenoid 82 releases latch 50 and lid 48 opens, the previously described switch 152 also will open. However, the relay 174 insures that the machine cannot be operated in the event that the opening of lid 48 is obstructed, for example by packages, a handbag or the like, or by a person's leaning on lid 48, and switch 152 therefore remains closed.

Having specifically described the invention illustrated in FIGURES 1 to 8, the operation thereof will now be described. The instructions to the purchaser are simple and are, of course, given on the outside of the machine housing 2. These instructions are as follows:

(I) Place bill in envelope.
(II) Deposit envelope in receptacle.
(III) Close lid.
(IV) Write in information and sign name here. (Arrow pointing.)
(V) Push button.
(VI) Tear off policy.

The purchaser deposits an envelope C, in which he has placed a bill, on tray 44, the lid 48 at this time being open due to spring 84. Lid 48 is then closed and locked by latch 50. If the purchaser has placed nothing on tray 44 to insulate contact 170 from contact 172, solenoid 82 will be energized to release latch 50 and cause lid 48 to be thrown open. Relay 174 also will open to prevent further operation of the machine. However, if the envelope C is deposited, the closure of switch 152 causes energization of solenoid 144 to move tray 44 to a position directly beneath write-in aperture 21 and shutter 20. Upon completion of this inward movement contacts 154 are closed by element 146 to thereby energize solenoid 16. The rocking of shaft 14 by solenoid 16 causes three effects. First, printing hammers 18 and 56 are driven against forms A and B to effect printing of the time and the premium paid for the policy. Second, counterclockwise rotation (in FIGURES 1 and 2) of arms 30 and 40 permits spring 38 to withdraw shutter 20 from beneath aperture 21. Third (FIGURE 7) shafts 100 and 104 will be rotated through linkage 108, 110, 112, 114, to thereby raise bars 52 and 54 and press tray 44, with envelope C, against the back of form B. As tray 44 moved envelope C inwardly, elements 60 and 62 were displaced to ride over the side edges of envelope C and then dropped to a position behind the rear edge of the envelope. The machine is now in readiness for writing by the purchaser on the write-in space on form A, which writing will be duplicated on form B and envelope C due to the carbon backings on forms A and B.

When the purchaser has finished writing the pertinent information on form A pushbutton 58 will be depressed to close switch 153, whereupon solenoid 144 will be de-energized due to the opening of switch 156 by energized solenoid 158. The de-energization of solenoid 144 permits the withdrawal of tray 44 by spring 16 and opening of contacts 154. As soon as tray 44 begins to withdraw, the opening of contact 154 causes de-energization of solenoid 16 and a reversal of the three effects previously mentioned, namely, the release of printing hammers 18 and 56, lowering of bars 52 and 54, and closing of shutter 20.

As the tray 44 withdraws, the back edge of envelope C, that is the edge which engages envelope pushing end 99 of tray 44, is engaged by elements 60 and 62 and prevented from returning with tray 44. Therefore, envelope C is caused to drop into the chute defined by members 95 and 97 to land on the pile 99.

As tray 44 moves outwardly to a position beneath lid 48 contact 72 comes into contact with contact 70, and solenoid 82 is energized to release latch 50. Thereupon, as lid 48 is thrown open by spring 84, contact 70 disengages from contact 72 to break the circuit through solenoid 82 and de-energize same. The operation of pushbutton 58 also causes operation of motor 160 for driving pin feed rolls 6 and 8. When a predetermined length of forms A and B has been fed the arm 162 will move around to the position where it momentarily opens switch 164 to turn off the paper feed motor 160, de-energize solenoid 158 and de-energize pushbutton holding coil 166. Pushbutton 58 will then be released and switch 156 will be closed to condition the machine for the next cycle of operation. The cycle of operation is now complete and all of the machine elements are in their original position.

The operation of pin feed rolls 6 and 8 has resulted in ejection of form A from the machine and the purchaser may now tear off (against tearing edge 11) and remove his copy of the insurance policy. In the meantime the underwriter's copy, form B, has been delivered to storage space 10 within the machine.

If the machine is provided with the means illustrated in FIGURE 8 for ejecting either a bill or envelope from tray 44, the operation is different in the following respects. During movement of tray 44 to the right in FIGURE 8 rubber finger 124 is poised above and does not engage bill C. When tray 44 reaches the limit of its inward travel it engages extension 134 of latch member 130 to release spring urged lever 126. The release lever 126 results in the rotation of finger 124 downwardly to engage and grip bill C. Therefore, when tray 44 withdraws, to the left in FIGURE 8, the bill will not be permitted to move with the tray. Accordingly, tray 44 will withdraw from under bill C, which will drop through space 64 onto the pile 99. When tray 44 withdraws to its limit of outward movement it engages abutment 140 to effect, through linkage 143 and 138, the resetting of latch member 130 and rotation of finger 124 to a raised position.

A second embodiment of the invention will now be described with reference to FIGURES 9A to D and FIGURES 10 to 13. The element of the machine according to the second embodiment are identical with the previously described machine to the extent of FIGURES 1 and 2, but with one exception. Whereas according to the first embodiment described, the backing or writing within the area of the aperture 21 is provided by tray 44, according to the second embodiment about to be described, this backing is provided by a platen 9, which is indicated in broken lines in FIGURES 1 and 2. Since the machine elements shown in FIGURES 1 and 2 have been previously described, such description will not be repeated. However, it will be understood that reference may be had to the prior description for details of elements mentioned hereafter which are shown in FIGURES 1 and 2.

Figure 9A:
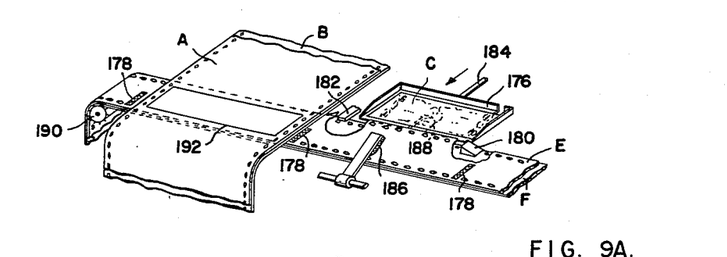
FIGURES 9A to 9D illustrate in perspective and schematically a second modification according to the invention.
Figure 9B:
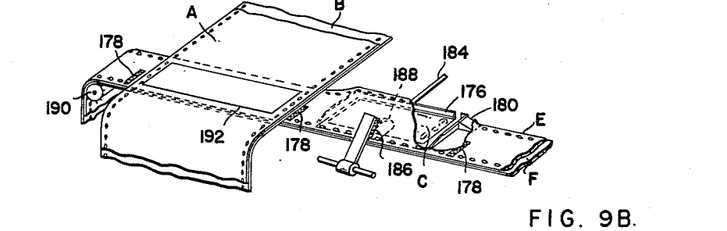

Referring to FIGURES 9A to 9D, which illustrates successive steps in the operation to be described hereafter, a pair of superposed webs E and F are fed transversely under forms A and B at the location of the write-in space 192 and aperture 21 (FIGURE 1). These webs E and F are adhered to each other, for example by adhesive or stapling, at points 178, but it should be noted that the webs E and F are adhered together along only a portion of their width, and as viewed in FIGURES 9A to D the forward edges of the webs are not joined. A tray 176 is adapted to receive a bill C (or an envelope in which the bill has been placed.) A wedge-shaped element 180 and a finger 182 are provided to separate slightly the webs E and F at the edge of the webs nearest tray 176 as they are fed toward forms A and B, thereby providing a space between webs E and F into which tray 176 may be projected by reciprocatory means 184 (as illustrated in FIGURE 9B). A finger 186 is provided above web E and in line with a cut-out portion 188 in the bottom of tray 176. This finger is adapted to move downwardly (FIGURE 9C) to tightly press the portions of webs E and F and bill C that are within the area of cut-out portion 188 against a platen 187. Pin feed means 190 are provided to feed webs E and F, which as shown are perforated along their margins, transversely beneath forms A and B, and will be described in greater detail hereafter.

Duplicate policy form B has a carbon backing opposite write-in space 192, so that the purchaser's writing 194 will be recorded directly on the section of web E which, with web F, envelops the bill that was deposited in payment for that particular purchaser's policy. If desired, web E likewise may have an ink backing, in which case the purchaser's handwriting 194 also will carry through to the bill C itself. The possibilities and considerations involved in the choice of a particular ink are the same as previously discussed with reference to FIGURES 3 to 8, that is, as examples, the ink may be visible or invisible. This expedient, however, is not necessary, but merely serves as positive proof that a particular counterfeit bill, for example, was without a doubt associated with a particular section of webs E and F, and not with another section that represents the policy issued to another purchaser.

Referring now to FIGURES 10 to 13 and the more specific description of this second embodiment of the invention, an opening in housing 2, through which there is access to tray 176, is adapted to be closed by a lid 196 having downwardly extending portions 198 and a finger plate 201. Apertures 203 are adapted to cooperate with a pair of latches, one of which is indicated at 202 in FIGURE 11, which are similar to the latch 50 described with reference to FIGURE 4. One or two latches 202 may be provided, but for simplicity of description only one latch 202 will be referred to in the description of the controls hereafter. Latch 202 is adapted to be opened by a slotted member 205 operated by a solenoid 204, and is normally urged against a stop 206 by a spring 208. Lid 196 is opened by a spring 210 upon actuation of latch 202 by solenoid 204.

As described more fully hereafter, an electrical contact 212 is provided in lid 196 to make contact, in the absence of a bill C, with a second contact 209 (see FIGURE 13) in tray 176. This contact 209 is in the form of a screw threaded into an insulating material 211, such as bakelite, embedded in the bottom of tray 176. It will be noted that the tray supporting plate 216 and tray 176 are cut away, respectively, at 218 and 214 to accommodate contact 212.

Finger 186 is mounted upon a rockable shaft 220 and is connected to a member 222 which is operated downwardly by a solenoid 224. Member 222 is positioned to operate also the switches 226 and 228 referred to hereafter in the description of the controls. The arm 230 supporting finger 186, which preferably is formed of a material such as rubber, desirably should be slightly springy.

Figure 14:
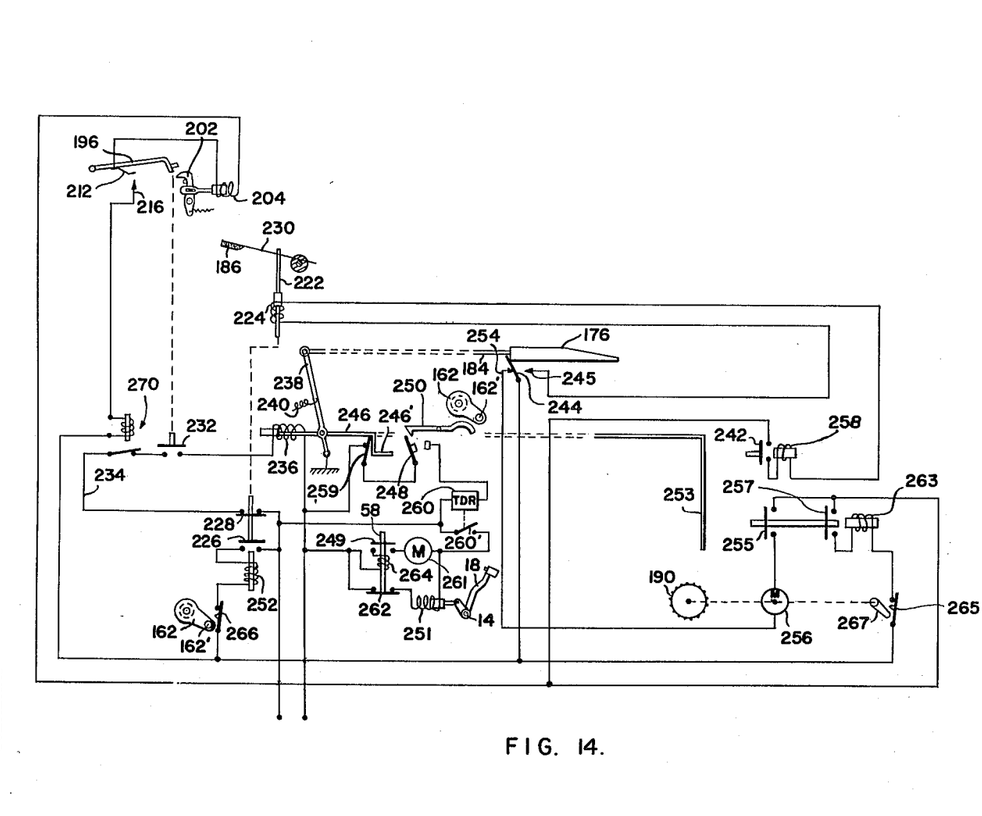
FIGURE 14 is a diagram showing the electrical and mechanical elements controlling the machine constructed according to FIGURES 9A to 9D and 10 to 13.

FIGURE 14 illustrates schematically the wiring and mechanical elements controlling the machine according to FIGURES 9A to D and 10 to 13. Tray 176 is reciprocated by the means 184 previously mentioned, which comprises a rod pivotally connected to an oscillating lever 238. Lever 238 is adapted to be oscillated by solenoid 236 acting through its operating link 246, and a fairly strong spring 240 acts to urge lever 238 to the left-hand position in FIGURE 14. Solenoid 236 is connected in series in line 234 through a normally closed switch 228 and a normally open switch 232 which is adapted to be closed in any suitable manner by the closing of lid 196. It will be seen that solenoid 204 and contacts 212 and 216 are in series with a relay 270 for opening line 234. Therefore, when lid 196 is closed and contacts 212 and 216 are not insulated from each other by the bill C or at least a piece of paper placed in tray 176, a circuit will be established through relay 270 to open line 234 and prevent energization of solenoid 236, and also to release latch 202. However, in the absence of contact between contacts 212 and 216, closing of lid 196 closes switch 232 to establish a complete circuit through solenoid 236.

Two normally open switches 259 and 248 are connected in series with a time delay relay 260. Relay 260 has a normally open switch 260' in series with a solenoid 251 and normally closed switch 262. Solenoid 251 is adapted to rock the shaft 14 previously described with reference to FIGURES 1 and 2 for actuating printing hammer 18. Switch 260' also is in series connection with a motor 261 and a switch 249. Motor 261 is for driving the pin feed rolls 6 and 8 shown in FIGURE 1 and previously described, and switch 259 is connected to the push button 58 positioned in housing 2 and also shown in FIGURE 1. Holding coil 264 is adapted to maintain switches 249 and 262 in the closed and opened positions, respectively, when switch 249 has been closed, (provided switch 260' of time delay relay 260 has been closed) due to the fact that it is in series with the switch 249. Link 246 has an extension 246' which, when link 246 has been moved by solenoid 236 to the right as viewed in FIGURE 14, is adapted to close switch 248. A latch 250 is provided to hold switch 248 in this closed position, and is adapted to be tripped by the element 162' of arm 162, which is the same arm 162 as shown in FIGURE 1 and as previously described. Switch 259 has been described as normally open and this is true despite the fact that it is shown in FIGURE 14 as being held closed by extension 246' in its rest position. Accordingly, as extension 246 moves to the right in FIGURE 14 switch 259 is permitted to open, but when extension 246' returns to the left, due to de-energization of solenoid 236, the switch 259 again is closed.

A two-way switch 244 is adapted to make contact with either of two contacts 254 and 245. Switch 244 is shown as being held by tray 176 in a position to make contact with contact 254, but upon movement of tray 176 to the right in FIGURE 14 switch 244 is released to move to its rest position wherein it makes contact with contact 245. Hence when tray 176 is in its rest position, that is to the left in FIGURE 11 and beneath lid 196, switch 244 makes contact with element 254, but as soon as tray 176 moves to the right in FIGURE 14 switch 244 is released to make contact with contact 245.

The previously mentioned solenoid 224, for pulling finger 186 downwardly to press against webs E and F, is connected in series with a switch 242, a holding coil 258 for switch 242, contact 245 and switch 244. Switch 242 is adapted to be closed by a further extension 253 of solenoid link 246. Therefore, as solenoid 236 drives tray 176 to the right in FIGURE 14 switch 244 makes contact with contact 245 and as soon as the tray 176 has reached the limit of this movement to the right extension 253 will close switch 252 to establish a circuit through the series connected solenoid 224. The holding circuit through coil 258 is adapted to be broken when tray 176 moves all the way to the left in FIGURE 14 and breaks the contact between switch 244 and contact 245, thereby de-energizing also the solenoid 224 and releasing finger 186. It will be noted that if holding coil 258 were not provided for switch 242, the finger 186 would be released just as soon as tray 176 began its withdrawal from between webs E and F, but it is desired to maintain the pressure by finger 186 until tray 176 has completely withdrawn. Secondly, if switch 242 were not provided, the finger 186 would be operated immediately upon inward movement of tray 176 and consequent closing of switch 244 and contact 245, but it is necessary to delay the operation of finger 186 until tray 176 has reached its full inward position and is completely within webs E and F. The foregoing will be more apparent from the sequential operation outlined hereafter.

The means for driving pin feed 190 for the webs E and F will now be described. The means for feeding webs E and F are "set" by the movement of extension 253 to the right in FIGURE 14 to close normally open ganged switches 255 and 257. Switch 257 is connected in series with its own holding coil 263 and a normally closed switch 265, and closing of switch 257 by extension 253 immediately establishes a circuit through holding coil 263, thereby maintaining both switches 255 and 257 in the closed position. Switch 255 is connected in series with the motor 256 for driving pin feed 190, and with contact 254 and switch 244. It will be seen that movement of extension 253 to the right in FIGURE 14 is necessarily accompanied by movement of tray 176 inwardly and to the right, and closing of switch 255 does not initiate operation of motor 256 because at this time switch 244 is released from contact with contact 254. However, withdrawal of tray 176 from between webs E and F and return to the left in FIGURE 14 causes switch 244 to make contact with contact 254, thereby establishing a circuit through the switch 255 and motor 256 connected in series therewith. An arm 267, which is similar to the arm 162 previously described, is driven by motor 256 and at the end of the feeding of a predetermined length of webs E and F this arm 267 momentarily opens switch 265 to thereby de-energize holding coil 263. Upon de-energization coil 263 releases and opens switches 255 and 257 and operation of motor 256 ceases. The means for driving pin feed 190 is then in readiness to be "set" by extension 253 at the next cycle of operation.

As previously mentioned member 222 for operating finger 186 also is adapted to open a switch 228 in line 234 and to close a switch 226 having in series therewith its holding coil 252. It will be seen, therefore, that when finger 186 moves downwardly to press against webs E and F the opening of switch 228 results in de-energization of solenoid 236 and withdrawal of tray 176 by spring 240 from between webs E and F. When tray 176 withdraws to its outer position the solenoid 224 is de-energized to release finger 186 due to the opening of contact 245 and switch 254 as previously described. It is to be noted that, normally, after tray 176 has so withdrawn it will not have therein a bill to insulate contacts 212 and 216 from each other, and therefore solenoid 204 will energize to release latch 202, thereby opening switch 232. In the event that the opening of lid 196 is prevented, for example by the presence of parcels or a handbag thereon, switch 232 will not open and in such a case, were it not for holding coil 252, the previously released switch 228 would have completed a circuit through solenoid 236. An unwanted second movement of tray 176 inwardly would follow. However, this cannot happen because, even if switch 232 does not open due to interference with opening of lid 196, holding coil 252 nevertheless will hold switch 228 open to prevent the re-energization of solenoid 236. Arm 162 (see also FIGURE 1) is employed to momentarily open switch 266 at the end of the machine's cycle of operation, and then only can switch 228 be closed.

The operation of the machine of the second embodiment of the invention will now be described. As directed by instructions written on the machine the purchaser places a bill in tray 176 (FIGURE 9A) and closes lid 196. The closing of lid 196 closes switch 232 to begin the cycle of operation. If the purchaser has not placed a bill in tray 176 before closing lid 196, contact 212 will touch contact 216 to energize solenoid 204 and release latch 202. The opening of lid 196 opens switch 232. Even if the purchaser holds his hand on lid 196, preventing the opening of switch 232, line 234 nevertheless will be opened by the energization of relay 270.

Figure 9C:
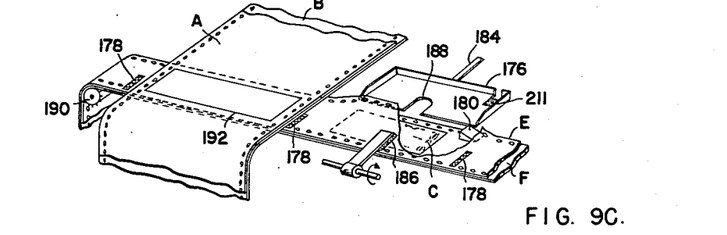

Assuming that relay 270 is not energized because a bill is absent from tray 176, the closing of switch 232 energizes solenoid 236 to move, through link 246, lever 238 and rod 184, the tray 176 to the right in FIGURE 14 and to a position between webs E and F (FIGURE 9B). Upon this movement (to the right in FIGURE 14) extension 246' closes switch 248, which is held in this position by latch 250. As tray 176 begins its inward movement contact is made between switch 244 and contact 245, and when this movement is completed extension 253 closes switch 242 to energize solenoid 224, thereby pulling finger 186 downwardly to press against form E (FIGURE 9B). Extension 253 also closes switches 255 and 257, which are maintained closed by holding coil 253. As finger 186 is pulled downwardly member 222 opens switch 228 and solenoid 236 is de-energized, whereupon spring 240 withdraws tray 176 from between webs E and F, leaving the bill C held firmly between webs E and F by finger 186 (FIGURE 9C). With the de-energization of solenoid 236 extension 246' closes switch 259. As tray 176 completes its outward movement (to the left in FIGURE 14) switch 244 breaks with contact 245 and establishes contact with contact 254, this breaking of contact effecting de-energization of solenoid 224 and holding coil 258. Finger 186 is thereby released, but switch 228 nevertheless remains open due to the action of holding coil 254 and switch 226. The making of contact between switch 244 and contact 254 completes the circuit through motor 256 and switch 255 and the operation of motor 256 causes pin feed 190 to advance a length of webs E and F until the bill therebetween is positioned beneath write-in space 192 (FIGURE 9D), as signaled by the opening of switch 265 by arm 267. The momentary opening of switch 265 de-energizes holding coil 263 and opens switch 256, as well as switch 257, to stop the motor 256.

When tray 176 returned to its outer position a bill was not present therein to insulate contacts 212 and 216 from each other, and therefore when tray 176 brought contact 216 back into engagement with contact 212 a closed circuit was established through solenoid 214 to energize the same and release latch 202. Lid 196, therefore, has been opened by its spring 210 and switch 232 is open. As previously noted, however, even if the opening of lid 196 is prevented for some reason, line 234 nevertheless has been opened by switch 228 and solenoid 236 cannot be re-energized until the end of the cycle of operation as signalled by the opening of switch 266 by arm 162. Solenoid 204 will remain energized until lid 196 is allowed to open to break contacts 212 and 216.

With the de-energization of solenoid 236, extension 246' moves to the left (in FIGURE 14) to close switch 259, and switches 259 and 248 both are now closed to establish a closed circuit through time delay relay 260. It is desirable to delay the rocking of shaft 14 to open shutter 20 until the feeding of a given length of webs E and F to position bill C under write-in space 192 has been completed. Therefore, even though switch 259 is closed at the same time as that motor 256 is activated, the time delay relay 260 delays the closing of switch 260' to energize solenoid 251 until this feeding of webs E and F has been completed. The condition of the machine at this stage is as follows: the shutter has been opened by the rocking of shaft 14 (by solenoid 251), a bill is positioned beneath the write-in space 192 and between webs E and F, tray 176 has withdrawn to its outer position, and lid 196 is open. The association of forms A and B, bill C and webs E and F at this point is illustrated in FIGURE 9D.

Figure 9D:
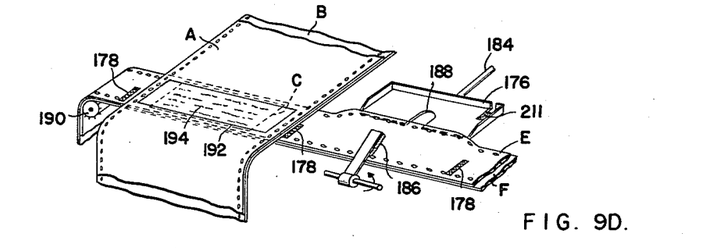
Figures 10, 11, 12, 13:
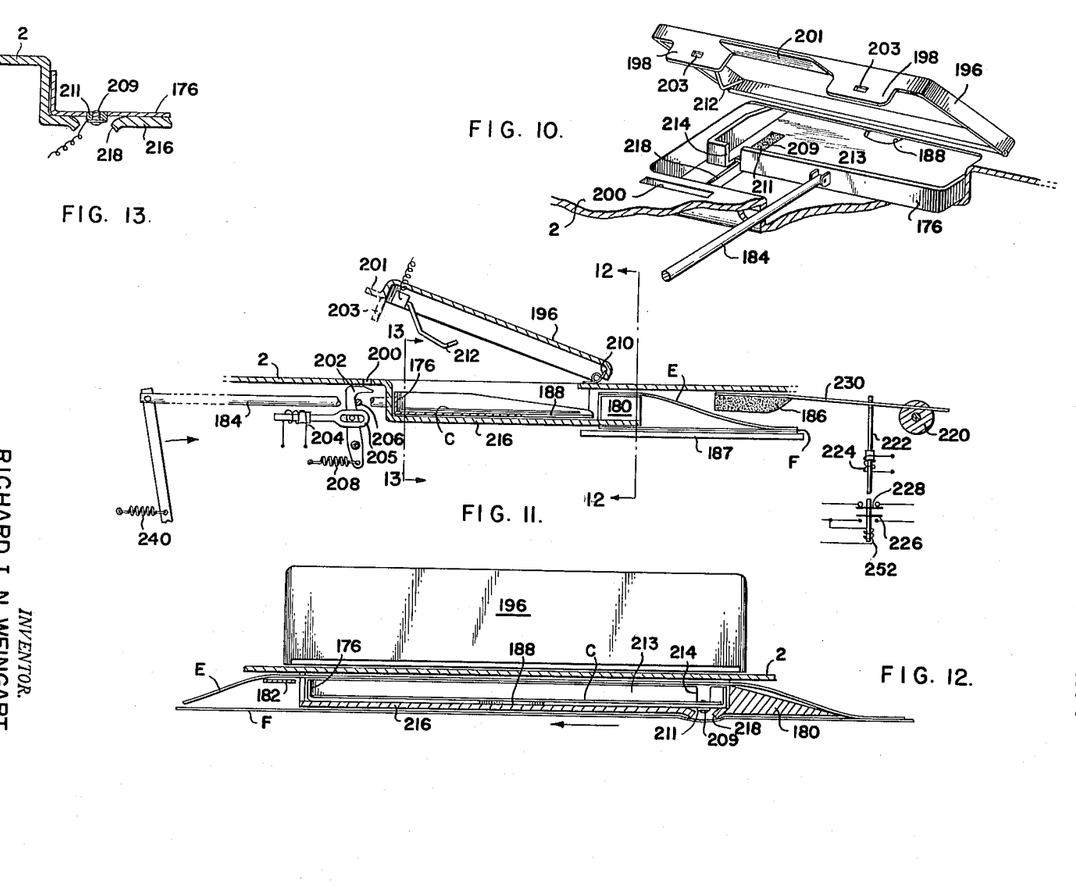
FIGURE 10 illustrates in perspective the tray and lid structure used in the machine of FIGURES 9A to 9D.
FIGURE 11 is a section through the structure shown in FIGURE 10.
FIGURE 12 is a cross-section taken on line 12—12 of FIGURE 11.
FIGURE 13 is a cross-section taken on line 13—13 in FIGURE 11.

The purchaser may now write the pertinent name, address and other information on form A (at 194, FIGURE 9D). When this is completed, according to instructions written on the machine, push button 58 is depressed to close switch 249 and open switch 262. The closing of switch 249 initiates operation of motor 261, which drives the pin feed rolls 6 and 8 (FIGURE 1). The opening of switch 262 de-energizes solenoid 251 to release printing hammer 18 and close shutter 20 by the means shown in FIGURES 1 and 2 and previously described. When the feeding of forms A and B is completed the arm 162 trips latch 250 to open switch 248.

The opening of switch 248 de-energizes time delay relay 260 to open its switch 260' and thereby cause de-energization of holding coil 264. Switch 249 is thereby opened to discontinue operation of motor 261. Upon completion of the feeding of forms A and B element 162' also momentarily opens switch 266 to de-energize holding coil 252 and allow switch 228 to reclose. The cycle of operation is now complete and the purchaser may tear off his copy of the insurance policy, form A, against tearing edge 11. The underwriter's copy, form B, has been fed to the storage space 10 within the machine.

It will be understood that webs E and F containing between them the bill C are delivered by pin feed 190 to a storage bin within the machine until they are collected for inspection of the bill to detect counterfeits or other substitutes for legitimate paper tender.

If a carbon backing is provided on original policy form A, the duplicate form B may be omitted and the web E can double as a record of all policies issued.

The instructions for operation of the machine according to the embodiment described with reference to FIGURES 9A to D and 13 to 14 are identical with the instructions for the operation of the machine previously described with reference to FIGURES 3 to 8.

A third embodiment of the invention is shown in FIGURES 15 to 19. Again, FIGURES 15 to 19 are to be considered in conjunction with FIGURES 1 and 2, which disclose structure which is common to all three embodiments of the invention. The mechanical elements shown in FIGURES 1 and 2 have been previously described and, therefore, this description need not be repeated. However, it will be understood that reference may be had to the foregoing description for details of those elements shown in FIGURES 1 and 2 which are mentioned hereafter.

Figures 15, 16:
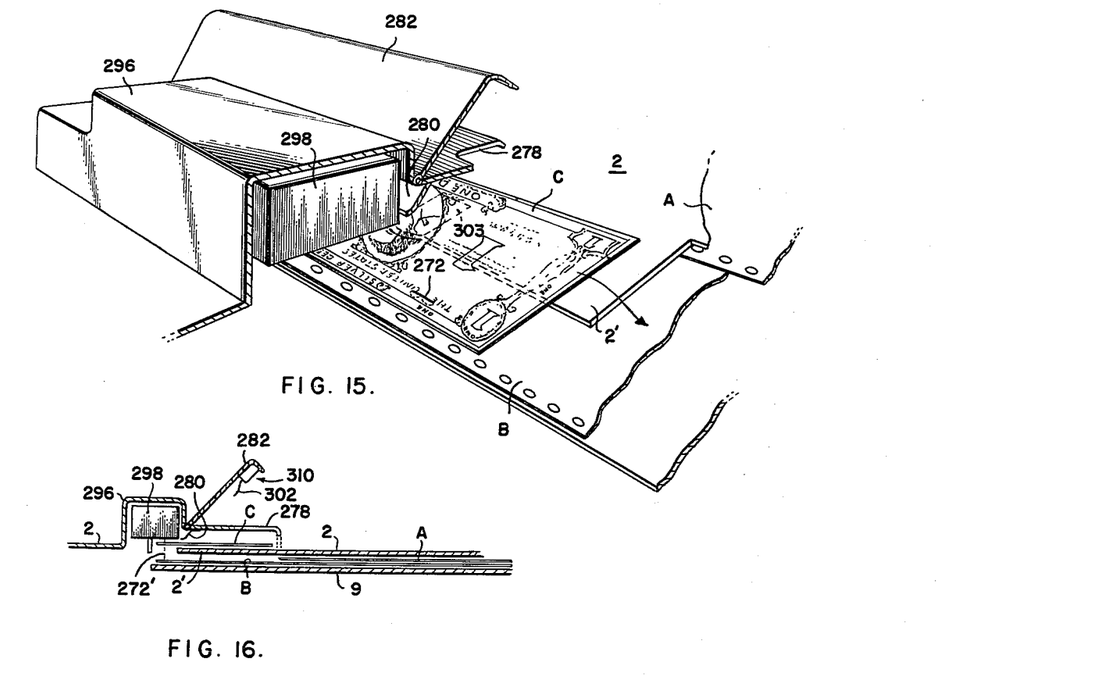
FIGURE 15 is a perspective view showing a third embodiment of the invention.
FIGURE 16 is a schematic cross-section illustrating the structure of FIGURE 15.
Figure 17:
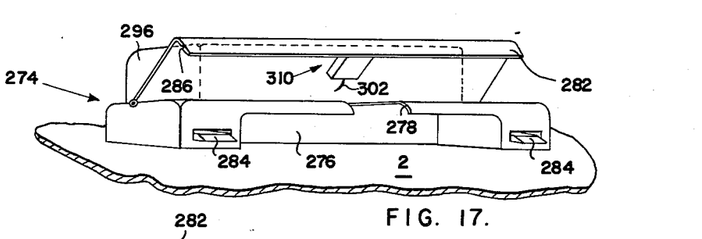
FIGURE 17 is a further perspective view of the embodiment shown in FIGURE 15.
Figure 18:
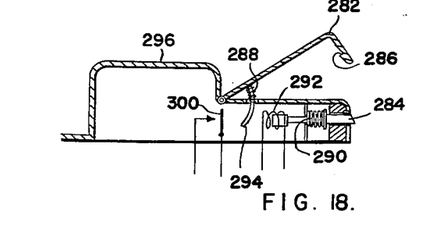
FIGURE 18 is a cross-section through the structure of FIGURES 15 to 17, and showing a latch device.

Referring to FIGURE 15, it will be seen that the duplicate form B is wider than the original form A that is retained by the purchaser, and it is to this extended marginal portion that according to the following embodiment of the invention a bill C is stapled as at 272. As shown in FIGURE 16 the device 274 has an opening 276 into which the bill C is inserted by hand. This is facilitated by a finger slot 278 and a shield 280 acts as a guard preventing one's placing his hand too far into the device 274. Lid 282 cooperates with latches 284 and has a mating notch 286. Lid 282 is urged to an open position by a spring 288. Latch 284 is urged outwardly by coil spring 290 and is adapted to be opened by solenoid 292. A curved projection 294 on lid 282 is adapted upon closing of lid 282 to close a switch 300, to be described more specifically hereafter. The rear portion 296 of the housing contains one or more conventional one-shot electric staplers 298 which is or are, as the case may be, adapted to staple the bill C to duplicate form B at one or more places. It should be noted that the housing 2 has a portion 2' which extends for a distance over duplicate form B and provides a table within the opening 276.

Figure 19:
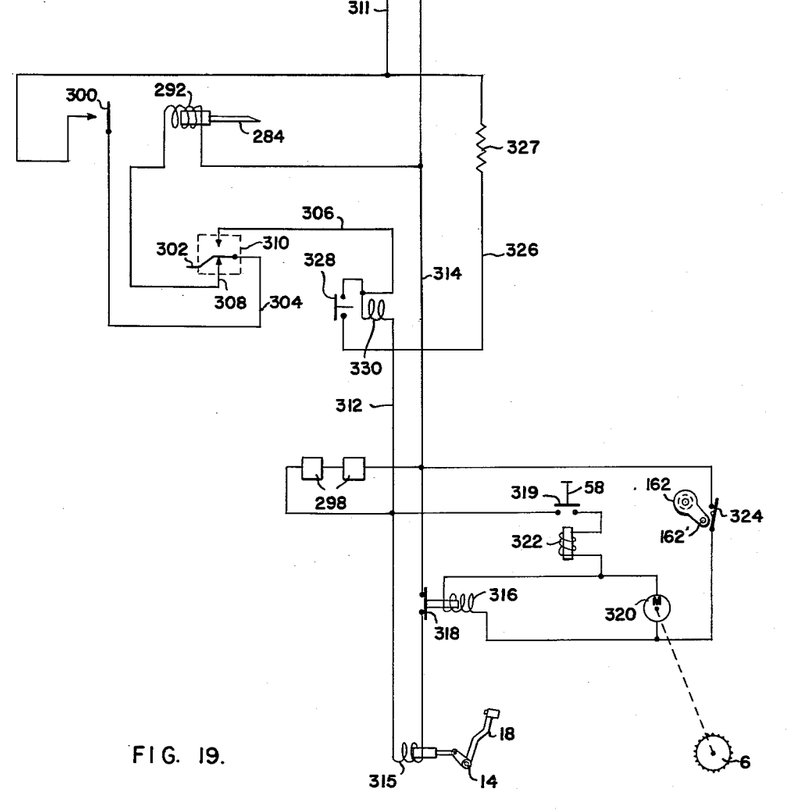
FIGURE 19 is a diagram showing the electrical and mechanical elements controlling a machine according to FIGURES 15 to 18.

It will be understood that the device 274 may be positioned at either side of forms A and B as they traverse platen 9 (FIGURES 1 and 2). Whereas in the previously described embodiments of the invention the detection of a bill deposited in the machine has been effected by a pair of contacts at opposite sides of a bill, according to the present embodiment such detection is effected by a mercury switch 310 which is inherently very sensitive. Referring to FIGURES 16 and 19, this mercury switch 310 is mounted on the lid 282 and has a feeler element 302. As evident from FIGURE 15, the extension 2' of housing 2 is indented at 303 to form a channel for accommodating feeler element 302 when lid 282 is closed and a bill C has not been inserted through opening 276. Feeler element 302 of mercury switch 310 has two positions; in the lower or normal position element 302 makes contact with a line 308, and in its upper position, which is caused by the presence of a bill C, it makes contact with a line 306. When a bill C is present on extension 2' the element 302 is not in a lower position wherein it is accommodated by indentation 303, but is supported and raised by the bill C to place it in an upper position wherein it makes contact through line 306. In the absence of a bill C, and after switch 300 has been closed by lid projection 294, a closed circuit is established through switch 300, lines 304, feeler element 302, line 308, and solenoid 292, since these elements are then connected in series. When a bill is present on extension 2', and after switch 300 has been closed by projection 294 of lid 282, a closed circuit is established through switch 300, line 304, element 302 and line 306. Summarizing, when feeler element 302 is lifted by the presence of a bill C, lines 311 and 312 are connected via switch 300 and mercury switch 310.

The one-short staplers 298 are connected across lines 312 and 314, and it will be seen that these staplers are energized when feeler element 302 is lifted by a bill C to the upper position wherein contact is established with line 306. A solenoid 315 is provided to rock the shaft 14 shown in FIGURES 1 and 2, and previously described, to operate printing hammer 18 and release shutter 20, as also previously described. Solenoid 315 is connected across lines 312 and 314, and it will be evident that the sensing of a bill C by feeler element 302 and closure of switch 300 by the closing of lid 282 provides a closed circuit through solenoid 315 and a normally closed switch 318 in the manner previously described with reference to FIGURES 1 and 2.

It will be noted that a relay coil 330 is interposed in line 312 and that when switch 300 is closed and feeler element 302 is in its upper position coil 330 will pull in to close a switch 328. Connected in parallel with solenoid 292, mercury switch 310 and switch 300 is a bypass line 326 having therein the switch 328 and a resistance 327. It will be noted, therefore, that coil 330 may be energized from either of two paths comprising line 326 as one and line 306 as the other. Accordingly, once the coil 330 has been energized to close switch 328 the switch 300 may be opened or feeler element 302 may drop to its lower position without interrupting the circuit through the push button switch 319 and motor 320. This arrangement is necessary because when forms A and B are fed, with the bill C stapled to form B, the bill C moves off the extension 2' and out from under feeler element 302, thereby causing feeler element 302 to be lowered to within the indentation 303. The contact with line 306 is thereby broken and ordinarily the interruption of current in line 312 would cause de-energization of holding coil 322 and stopping of motor 320 at an intermediate stage of feeding forms A and B. Obviously this is not satisfactory and accordingly the switch 328 is provided to maintain, after bill C has moved from under feeler element 302, the closed circuit through motor 320 until switch 324 is opened by element 162' to finally de-energize coil 330.

Across lines 312 and 314 there are connected the various controls and driving means for pin feed rolls 6 and 8 (FIGURE 1). Push button 58, which is provided in the housing 2 as shown in FIGURE 1, is adapted to close a switch 319 having its own holding coil 322 and connected in series with motor 320 for driving pin feed rolls 6 and 8. Also connected in series with switch 319 and holding coil 322 is a solenoid 316 for opening switch 318, the solenoid 316 and motor 320 both being connected in series with a normally closed switch 324. It will be noted that the means just described are similar to the controls previously described in FIGURE 6 for driving pin feed rolls 6 and 8. When switch 319 is closed, motor 320 is connected directly across lines 312 and 314 to drive pin feed rolls 6 and 8 until the element 162' previously mentioned with reference to FIGURE 1 momentarily opens normally closed switch 324. Likewise, when switch 319 is closed solenoid 316 is energized to open switch 318 and de-energize solenoid 315, thereby releasing shaft 14 to close shutter 20 and release printing hammer 18.

The operation of this third embodiment of the machine is as follows. As directed by instructions written on the machine, the purchaser places a bill C through the opening 276 so that the bill C is in the position illustrated in FIGURES 15 and 16. Lid 282 is then closed and simultaneously projection 294 on lid 282 closes switch 300. The presence of bill C raises feeler element 302 to make contact with line 306 to establish a closed circuit through switch 300, mercury switch 310, coil 330, line 312, solenoid 315, switch 318 and line 314. Switch 328 is closed and held by coil 330. Solenoid 315 is energized to rock shaft 14. As evident from FIGURES 1 and 2 this rocking of shaft 14 effects the striking of printing hammer 18 against forms A and B, and the release of shutter 20 so that it may be withdrawn from beneath aperture 21 by spring 38 (FIGURES 1 and 2). Shutter 20 opens and through aperture 21 the purchaser may now write on form A the pertinent information such as name, address, etc. It will be noted that at this time the lid 282 is locked by latch 284 against access to the bill C which the purchaser tendered in consideration for the policy. Also, this bill C already has been stapled (272') to the duplicate, form B, of the policy form A that is to be issued to the purchaser. Upon completion of this writing on form A button 58 is depressed by the purchaser to initiate feeding of forms A and B. The closing of switch 319 by button 58 initiates operation of motor 320 and as form B, with bill C stapled thereto, and form A are advanced bill C moves from extension 2', resulting in feeler element 302 being lowered. Ordinarily, as previously mentioned, this would cause motor 320 to stop in the middle of its feeding operation, but in the meantime a parallel path has been closed by the functioning of relay 330 to close switch 328. Therefore, the operation of motor 320 will continue until element 162' completes a single revolution and momentarily opens switch 324 to de-energize holding coil 322 and coil 330. In the meantime, when feeler element 302 ceased to be supported by a bill C and dropped to establish contact with line 308 the solenoid 292 was energized to release latch 294, with consequent opening of lid 282. Prior to opening of switch 324, solenoid 316 has held switch 318 open, thereby effecting de-energization of solenoid 315 and release of shaft 14 to close shutter 20, as previously described, and to release printing hammer 18. When switch 318 is finally closed by the de-energization of solenoid 316 the solenoid 315 will not be re-energized due to the fact that in the meantime switch 300 has been opened by the opening of lid 282. The momentary opening of switch 324 represents completion of the cycle of operation and places the machine in readiness for the next cycle of operation. It is to be noted that if the purchaser had not placed a bill C within opening 276, upon closure of lid 282 the feeler element 302 would not have been lifted to make contact with line 306 and, therefore, the machine could not be operated. Instead, through line 308, the solenoid 292 would have immediately been energized to pull in latch 284 and open lid 282. Therefore whether the purchaser holds down the lid 282 or not, the machine cannot operate unless a bill C, or at least a piece of paper, is deposited within opening 276.

It will be understood that staplers 298 are of the one-shot type which staple only once upon each energization, and do not staple again until they are de-energized and then re-energized. The invention, however, is not limited to the stapling of bills to the duplicate form B.

In the structure of the invention according to FIGURES 15 to 19 the lever 24 shown in FIGURE 1 may be merely extended as at 316 to operate shutter 20, and lever 22 and link 36 may be eliminated.

In all of the disclosed embodiments of the invention means have been provided to prevent operation of the machine if a bill is not deposited. However, it is significant to note that such means are not necessary, for if the machine dispenses an insurance policy, despite the fact that a bill was not deposited, the absence of a bill stapled to the duplicate, or the absence of a bill between webs E and F or within an envelope, will provide evidence of the fraud. Similarly, the absence of any bill according to the first described embodiment of the invention, having writing thereon corresponding to that on the policy taken out by a claimant will provide usable evidence.

It will be further understood that the invention is not limited to the issuance of trip insurance policies, but might be used, for example, in the issuance of other documents representing future obligations of a contractor.

This application discloses subject matter which is claimed in my copending application Serial No. 128,123, filed July 13, 1961.

It will be understood that various departures from the specifically illustrated forms of the invention may be made without departing from the scope of the invention, as defined by the following claims.

What is claimed is:

1. A machine comprising means for receiving paper tender, means controlled by the first-mentioned means following receipt of said tender for providing access to a form for writing thereon, means for positioning said paper tender underneath said form at an area to which said access is provided to transfer to said tender matter written on said form, means for feeding and issuing said form, and means for retaining said paper tender.

2. The combination comprising an enclosure, a supply of forms within said enclosure, means for receiving paper tender, means controlled by the first-recited means following receipt of said tender for providing access through said enclosure to at least a portion of a form to permit writing thereon, means for positioning said tender directly beneath said portion, ink means for reproducing on said tender at least a portion of said writing, means for feeding and issuing said form, and means for retaining said paper tender.

3. A machine comprising an enclosure having an opening, a shutter normally closing said opening, means for positioning a form to be issued beneath said opening, means for receiving paper tender, means controlled by said receiving means following receipt of said tender for opening said shutter to permit writing on said form, means for positioning said paper tender directly beneath said opening, means for reproducing at least some of said writing on said paper tender, means for ejecting the form from said enclosure, and means for retaining said paper tender.

4. A machine comprising an enclosure having an opening, means positioning a form within said enclosure and beneath said opening, a receiver for paper tender, means for positioning said receiver and paper tender therein beneath and in direct contact with said form at the location of said opening, whereby impressions caused by writing on said form are also produced on said paper tender, means for ejecting said form from the enclosure, and means for retaining said form.

5. A machine comprising means for feeding superposed sheets including an original form and a record member, a tray for receiving paper tender, an enclosure for said machine having an opening and limiting access to said sheets to the area underlying said opening, means for positioning said tray and paper tender supported thereon beneath said area to provide a backing for writing on said sheets, whereby impressions on said sheets are produced also on said paper tender, means for feeding said sheets and dispensing said original form, and means for retaining said record member and paper tender.

6. A machine comprising means for positioning a form, means limiting access to said form to a particular area thereof, a tray for receiving paper tender, means for positioning said tray beneath said form at said area, means for pressing said tray upwardly against the back of said form, means for withdrawing said tray, means for removing said paper tender from said tray during said withdrawal and retaining the paper tender within the machine and means for feeding and dispensing said form from the machine.

7. A machine comprising an enclosure having first and second openings therein, means for positioning a form within said enclosure and under said first opening, a shutter normally closing said first opening, a receiver for paper tender positioned in said second opening, means for closing said second opening, means for locking said closing means in closed position, means operable upon closure of said closing means to position said receiver beneath said form and first opening and against said form, means responsive to the last-mentioned positioning to open said shutter, means operable subsequent to said opening to eject said form from the machine, means for then returning said tray to said second opening and releasing said locking means, and additional means responsive to the absence of paper tender in said receiver to interrupt operation of the above-mentioned means.

8. A machine comprising means operable to position in superposed relationship a form and a record member, means reciprocable between first and second positions for receiving, at the first position, paper tender and positioning the same, at the second position, beneath an area of said form and record member where matter is to be recorded, whereby impressions of matter recorded on said form and record member are at least partially reproduced on said paper tender, means thereafter presenting said form for removal from the machine and means retaining said paper tender within the machine.

9. A machine comprising means operable to dispense a form and present the same for removal from the machine, means for receiving paper tender and for positioning the same beneath an area of said form, the last-mentioned means also providing backing for writing on said form at said area, means normally prohibiting access to said area and operable in response to operation of the said last-mentioned means to provide access to said area of the form and permit writing thereon, whereby writing impressions on said form are reproduced on said paper tender positioned therebeneath, means for thereafter effecting operation of the first-mentioned means, and means effecting delivery of said paper tender to a space within said machine closed against unauthorized access.

10. A machine comprising means operable to position in superposed relationship a form and thereunder a record member, means for receiving paper tender and positioning the same directly against an area of the underside of said record member, the last-mentioned means also providing backing for writing on said form over said area, means normally prohibiting access to said form and operable following operation of the said last-mentioned means to provide access to said form and permit writing thereon, whereby writing impressions on said form are at least partially reproduced on said record member and paper tender, and means operable following operation of the last-recited means to present said form for removal from the machine.

11. A machine comprising means positioning superposed upper and lower forms, means delimiting a write-in area on said upper form, means for guiding paper tender to a position beneath at least one of said forms and providing an underlying support for writing on said upper form, means reproducing on said paper tender and lower form at least a portion of writing impressed on said upper form within said write-in area, means presenting said upper form for removal from the machine following said writing, and means effecting delivery of said lower form and paper tender to positions within the machine closed against unauthorized access.

12. A machine comprising means for positioning a form for writing thereon, means delimiting a write-in area on said form, means for receiving paper tender and moving the same to directly beneath said form and in backing relationship therewith, means conditioning operation of the last-mentioned means upon receipt thereby of said paper tender, means for reproducing on said paper tender at least a portion of writing effected in said write-in area, means operable for removing said form from the area of said delimiting means and presenting the form for removal from the machine, means effecting delivery of said paper tender to a space within the machine closed against unauthorized access, and means operable at will to initiate operation of the two last-recited means.

13. A machine comprising means for positioning a form, means for receiving a unit of paper tender inserted in the machine at a first position and supporting the same in backing relationship directly beneath a limited area of said form at a second position, means moving said receiving and supporting means from said first to said second position and returning the same to said first position to receive the next successive unit of paper tender inserted in said machine, means restricting access to said form to said limited area, means for reproducing on said paper tender writing impressed on said form within the said limited area thereof, means presenting said form for removal from the machine, and means for delivering said paper tender to a space within the machine closed against unauthorized access.

14. A machine comprising means for positioning superposed upper and lower forms, means for providing access to a limited area of the uppermost of said forms, means for receiving paper tender and supporting same in backing relationship directly beneath said forms at an area to which said access is provided, whereby said paper tender is subjected to writing impressions on said uppermost form, means for reproducing said writing impressions on said lower form, means presenting said uppermost form for removal from the machine and feeding said lower form to a position within the machine closed against unauthorized access, and means effecting delivery of said paper tender to a position within the machine closed against unauthorized access.

15. A machine comprising means positioning superposed upper and lower forms, means delimiting a write-in area on said upper form, means operable to permit or normally prevent access to said write-in area, means for receiving paper tender, means operable to move said receiving means and paper tender carried thereby to a position directly beneath said forms, said receiving means when in said position providing a support for writing on said upper form, means responsive to the receipt of paper tender by said receiving means to effect operation of said means for moving the receiving means to said position, the last-mentioned means also comprising means for effecting operation of the third-mentioned means to permit access to said write-in area, means reproducing at least a portion of writing impressed on said upper form within said write-in area on said lower form and paper tender, means presenting said upper form for removal from the machine, means effecting delivery of said lower form and paper tender to positions within the machine closed against unauthorized access, and means operable at will to initiate operation of the last two mentioned means.

16. A machine comprising means for positioning superposed upper and lower forms, means for receiving paper tender and supporting the same in backing relationship directly beneath a limited area of said forms, means responsive to receipt of paper tender by the last-mentioned means to provide access to the said limited area of the uppermost of said forms, means for reproducing on said paper tender and the lowermost of said forms at least a portion of the writing impressions in the said limited area of the uppermost form, means presenting said uppermost form for removal from the machine, and means for delivering said lowermost form and said paper tender to positions within the machine closed against unauthorized access.

References Cited in the file of this patent

UNITED STATES PATENTS

| | | |
|---|---|---|
| 414,795 | Clifford | Nov. 12, 1889 |
| 1,248,543 | Powers | Dec. 4, 1917 |
| 1,344,909 | Lederman | June 29, 1920 |
| 1,506,491 | Kline | Aug. 26, 1924 |
| 1,831,429 | Swearingen | Nov. 10, 1931 |
| 2,215,004 | Knox | Sept. 17, 1940 |
| 2,296,865 | Morse | Sept. 29, 1942 |
| 2,306,518 | Bernart | Dec. 29, 1942 |
| 2,656,198 | Winders | Oct. 20, 1953 |
| 2,662,472 | McConaha et al. | Dec. 15, 1953 |